United States Patent

Boody et al.

[11] Patent Number: 5,882,252
[45] Date of Patent: Mar. 16, 1999

[54] LOIN PULLER

[75] Inventors: Lawrence D. Boody, Oliver Springs; David L. Chappell; James K. Kirkpatrick, both of Loudon, all of Tenn.

[73] Assignee: Acraloc Corporation, Oak Ridge, Tenn.

[21] Appl. No.: 864,097

[22] Filed: May 28, 1997

[51] Int. Cl.[6] .................................................. A22C 18/00
[52] U.S. Cl. ............................................ 452/171; 452/136
[58] Field of Search .................... 452/171, 136, 452/135

[56] References Cited

U.S. PATENT DOCUMENTS

| | | | |
|---|---|---|---|
| Re. 28,508 | 8/1975 | Neebel et al. | |
| 2,510,173 | 6/1950 | Harter | |
| 3,352,011 | 11/1967 | Alexander et al. | 30/140 |
| 3,546,737 | 12/1970 | Neebel et al. | |
| 3,771,196 | 11/1973 | Doerfer et al. | |
| 3,789,456 | 2/1974 | Doerfer et al. | |
| 3,849,836 | 11/1974 | Bernard et al. | |
| 4,189,806 | 2/1980 | Van Heyningen | |
| 4,970,755 | 11/1990 | LeBlanc et al. | 452/134 |
| 4,979,269 | 12/1990 | Norrie | 452/171 |
| 5,090,939 | 2/1992 | Le Blanc | 452/127 |
| 5,234,371 | 8/1993 | Andre et al. | 452/171 |
| 5,295,898 | 3/1994 | Andre et al. | 452/171 |
| 5,407,384 | 4/1995 | Boody et al. | 452/171 |
| 5,514,032 | 5/1996 | Young et al. | 452/171 |
| 5,725,424 | 3/1998 | Dufour et al. | 452/160 |

FOREIGN PATENT DOCUMENTS

| | | | |
|---|---|---|---|
| 1079114 | 6/1980 | Canada | 99/208 |

*Primary Examiner*—Willis Little
*Attorney, Agent, or Firm*—Pitts & Brittian, P.C.

[57] ABSTRACT

A loin puller apparatus that incorporates a scribe saw with an associated decelerator and depth gauge immediately in advance of the loin knife for the purpose of cutting through the ribs of the carcass middle. To assist in orienting a carcass middle with regard to the scribe saw and loin knife, the apparatus is provided with a load bar that engages the chine and provides for a more uniform alignment of the carcass middle with the loin knife in relation to the position of the chine. Also, a guide bar that is in substantial alignment with the load bar is provided to assist in the initial alignment of the carcass middle as the carcass middle is loaded into the loin puller. A laterally driven impeller is provided to force the chine portion of the carcass middle into the load bar, thus straightening the chine against the load bar. The impeller is also rotatably driven to assist in driving the carcass middle toward the loin knife. A programmable logic controller, ("PLC"), is provided to control various operations of the loin puller device.

20 Claims, 16 Drawing Sheets

LOIN PULLER

TECHNICAL FIELD

This invention relates to apparatus used in the meat processing industry, and more particularly to apparatus used to separate the loin portion of meat from carcass halves. Although the apparatus described herein was designed for the purpose of separating pork loins, it can be used for similar operation on other types of meat.

BACKGROUND ART

In the field of meat processing, such as pork processing, it is well known that excess fat is removed from the back of the loin of a animal carcass to recover the loin before final cutting and/or packing the meat for market. Typically, the carcass of the animal is cut into two halves, and then cut transversely to remove the hind and fore quarters. The resulting portion is commonly referred to as the "middle" and will be referred to herein as the "carcass middle". Each carcass middle includes a loin to be removed from the back fat. The loin is adjacent to the back bone, or chine, and is situated between the ribs and the outer layer of fat.

Various automatic devices have been developed to provide for the separation of the loins from the carcass middle. Typical of the art is the device disclosed in U.S. Pat. No. 4,189,806 issued to W. P. Van Heyningen on Feb. 26, 1980 and Canadian Patent No. 1,079,114 issued on Jun. 10, 1980. Both of these disclose the same invention and, like other known devices at that time, required the carcass middle to be further subdivided prior to the removal of the loin.

A device for accomplishing the automatic removal of the loin from a full carcass middle is described in U.S. Pat. No. 5,234,371 owned by a common assignee of the present invention. A further device for accomplishing the automatic removal of the loin from a full carcass middle is disclosed in U.S. Pat. No. 5,395,898 also owned by a common assignee of the present invention. Additionally, U.S. Pat. No. 5,407,384, ("the '384 patent"), also owned by a common assignee to the present invention, discloses a further device for accomplishing the automatic removal of the loin from a full carcass middle. These devices are incorporated herein by reference for teachings regarding the general structure and operation of a "loin puller". It is an improvement over the device disclosed in the '384 patent that is described fully hereinafter.

The shortcoming of the known art, including that of the above cited U.S. Pat. No. 5,234,371, and the '384 patent, is that, as known in the art, the chine is naturally curved and the known devices do not include a means for straightening the chine as the carcass middle approaches and engages the loin knife. And, while the loin puller described in the '384 patent includes a guide plate at the edge of the work surface for positioning the carcass middle during its movement through the device, the known devices do not include means for insuring that the carcass middle is automatically aligned with the loin knife in reference to the positioning of the chine. Also, since the invention of the device disclosed in the '384 patent, it has been learned that the loin can be more uniformly pulled if the depth of the scribe saw cut can be limited. Finally, the known devices do not automatically detect when the carcass middle has reached the location of the scribe saw and are thus unable to automatically activate the downward motion of the scribe saw for engagement with the carcass middle.

Accordingly, it is an object of the present invention to provide a guide bar for guiding the carcass middle into the loin puller and to provide a load bar that engages the chine in order to uniformly align the carcass middle with the loin knife.

A further object is to provide a means for pressing the chine against the load bar as the carcass middle travels through the loin puller so as to substantially straighten the chine before the carcass middle engages the scribe saw and the loin knife.

Still another object of the present invention is to provide for a means of decelerating the downward movement of the blade of the scribe saw and to limit the depth of the cut of the scribe saw.

Yet another object of the present invention is to provide automatic engagement and disengagement of the scribe saw with the ribs of the carcass middle.

Other objects and advantages over the prior art will become apparent to those skilled in the art upon reading the detailed description together with the drawings as described as follows.

DISCLOSURE OF THE INVENTION

In accordance with the present invention, there is provided a loin puller apparatus that incorporates a scribe saw immediately in advance of the loin knife for the purpose of cutting through the ribs of the carcass middle. The lateral orientation of the blade of the saw corresponds to the lateral orientation of the portion of the loin knife that is to pass through the cut ribs. When the position of the loin knife is changed, the lateral position of the saw blade is changed accordingly. In order to limit the depth of the scribe saw cut, a decelerator and depth gauge is provided in conjunction with the scribe saw.

To further assist in orienting a carcass middle with regard to the scribe saw and loin knife, the apparatus can be provided with a load bar that engages the chine and provides for a more uniform alignment of the carcass middle with the loin knife in relation to the position of the chine. A guide bar can also be provided to assist in the initial alignment of the carcass middle as the carcass middle is loaded into the loin puller. In this regard, the guide bar and the load bar are in substantial alignment. A laterally driven impeller is provided to force the chine into the load bar, thus straightening the chine against the load bar. The impeller is also rotatably driven to assist in driving the carcass middle toward the loin knife.

In addition, a programmable logic controller, ("PLC"), is provided. At least one sensor is selectively positioned in the carcass middle path immediately prior to the scribe saw blade. This sensor is in electronic communication with the PLC. When the sensor detects the presence of the carcass middle, the PLC automatically engages the scribe saw blade against the ribs of the carcass middle. The PLC also automatically disengages the scribe saw. A further sensor can be used to measure the depth of the back fat and this information is utilized by the PLC to automatically adjust the initial height of the loin knife.

BEST MODE FOR CARRYING OUT THE INVENTION

Figure 1:
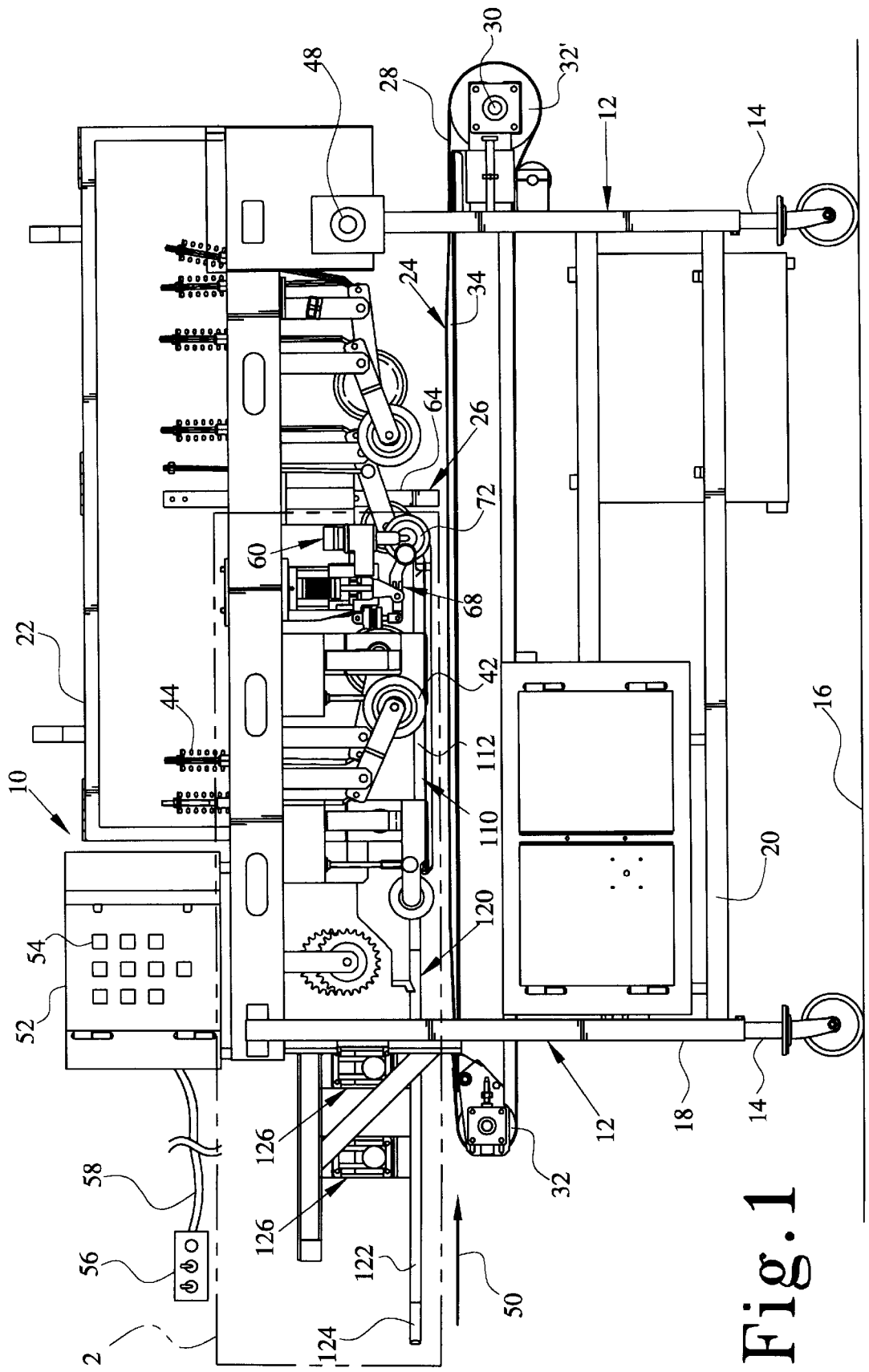
FIG. 1 illustrates a side elevation view of a loin puller apparatus, including a load bar and a guide bar according to the present invention, some portions of the base apparatus being cut away so as to show more clearly the position of the load bar and guide bar.

An improved loin puller, constructed in accordance with the present invention, is illustrated generally as 10 in the figures. Loin puller 10 has a frame 12 that is provided with leg members 14 for supporting the same from a floor 16. Uprights 18 and horizontal members 20 support the various components, and it will be understood that there are also transverse elements that cannot be seen in this figure that complete the frame 12. Further, there is illustrated a upper frame portion 22. Of course, it will be recognized that the configuration depicted in this and the other figures with regard to the frame is so depicted for simplicity, and is not intended to limit the frame to such configuration.

As will be understood from above-referenced U.S. Pat. No. 5,234,371, and U.S. Pat. No. 5,407,384, there is a conveyor means 24 for conveying the carcass middle toward the loin knife assembly 26. This conveyor means 24 has a conveyor belt 28, driven by a motor 30 (by any suitable interconnection), that runs on engagement wheels 32, 32'. Those skilled in the art will recognize that wheel 32' is subject to bumping which can cause wear on the shaft of motor 30. In this regard, in the preferred embodiment, a knuckle joint 33 is used in order to maintain a concentric relationship between motor 30 and engagement wheel 32'. The conveyor belt 28, in the area of support of a carcass middle, is substantially in contact with a work surface 34. Further, there is at least one, and preferably two (see FIG. 3), loin engagement means 36 for advancing the carcass middle toward the loin knife assembly 26, with this engagement means 36 having engagement teeth 38 mounted upon interconnected chain links 40. This engagement means 36 is typically driven in a desired direction by motor 48, with appropriate synchronization with the movement of the conveyor belt 28. However engagement means 36 can also be driven by the aforementioned motor 30 through suitable connection. Additional control of the carcass middle is achieved through the use of a plurality of rollers 42 that are biased downwardly against the carcass middle by spring elements 44. As described in our earlier patents, rollers 42 can also be downwardly biased against the carcass middle by means of piston-cylinder units (not shown).

Principal control of the device 10 is through a controller 52 attached to the frame 12. This contains operational switches 54 and elements to indicate the condition of operation. In addition, there is a portable auxiliary controller 56 connected to the main controller 52 through a cable 58 for use by an operator of the device 10. In the preferred embodiment, controller 52, the associated operational switches 54 and the auxiliary controller 56 would all be in electronic communication with a Programmable Logic Controller 210, ("PLC"), that, as is described in more detail below, would have selective control over the various operations of loin puller 10.

A major departure of the present invention from that shown and described in the afore-cited U.S. Pat. No. 5,407,384 is the addition of a load bar assembly 110 for engaging the chine portion 114 of the carcass middle 116 in order to align the carcass middle 116 with loin knife 64, a guide bar assembly 120 that engages the carcass middle 116 as it is loaded into the loin puller and aligns it with the load bar, and an impeller assembly 130 that forces the chine portion 114 against the load bar in order to straighten the chine 114 and align the carcass middle 116 with loin knife 64 in relation to the position of the chine 114. Impeller assembly 130 also actively drives the carcass middle 116 toward loin knife 64.

Figure 11:
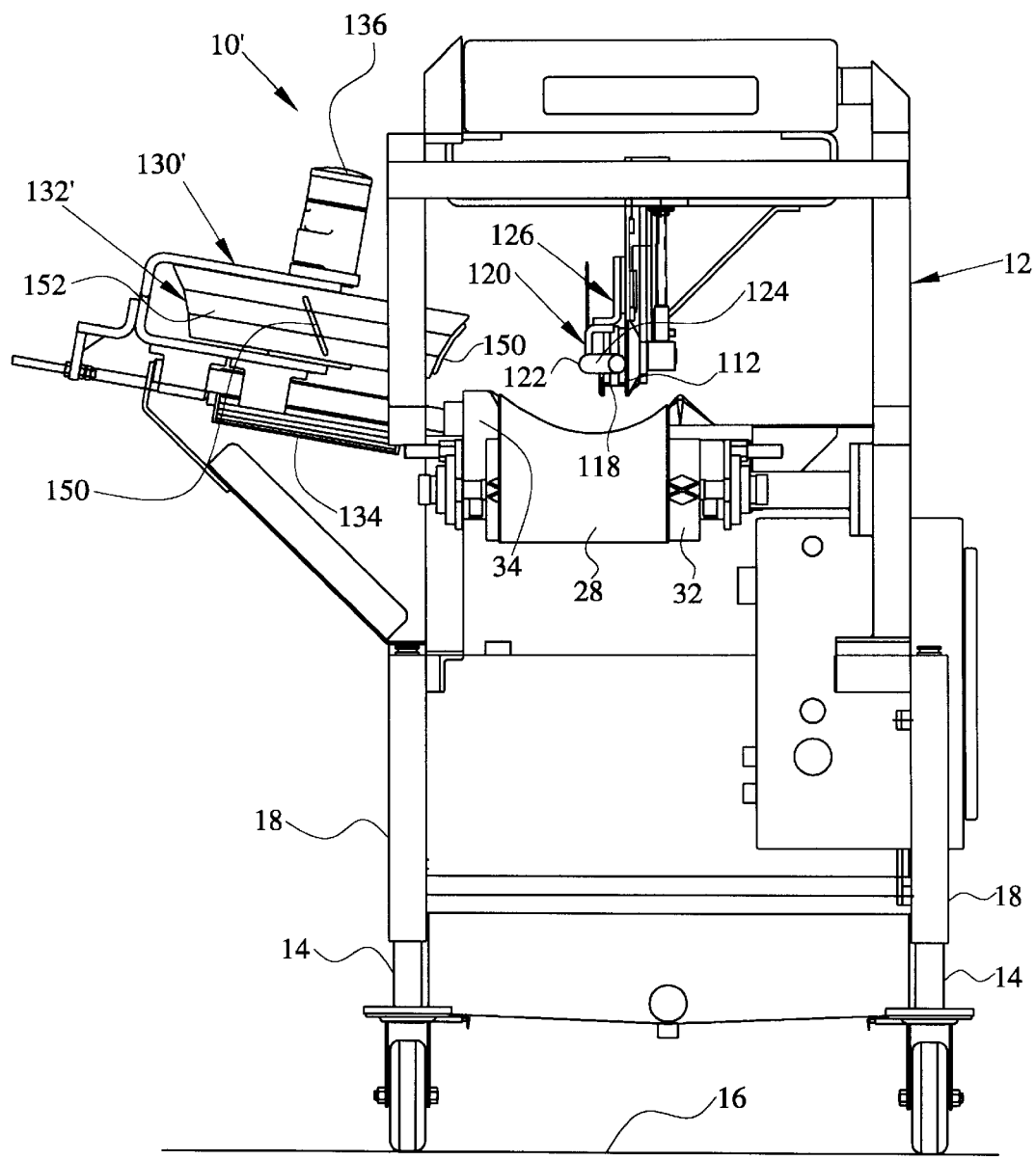
FIG. 11 illustrates a side elevation view of an alternate embodiment of the loin puller shown in FIG. 1 showing the drum mechanism in the idle position.

Load bar assembly 110 is carried by frame 12 and has an elongated load bar 112 for engaging the chine portion 114 of the carcass middle 116 and for aligning carcass middle 116 with loin knife 64. In the preferred embodiment, load bar 112 is carried by frame 12 in such a manner as to restrict and substantially prevent lateral movement of load bar 112 and selectively restrict vertical movement of load bar 112. Further, as seen in FIG. 11, which shows load bar 112 in partial cross-section, load bar 112 preferably includes an inverted channel 118 which registers with one of the chains that make up engagement means 36. In this regard, one of the chain members of engagement means 36 traverses through inverted channel 118.

To assist in aligning carcass middle 116 with load bar 112, a guide bar assembly 120 is also provided in the preferred embodiment. Guide bar assembly 120 is carried by frame 12 and is located at the loading end of loin puller 10 proximate load bar assembly 110. Guide bar assembly 120 includes an elongated guide bar 122 that engages carcass middle 116 as carcass middle 116 is loaded into loin puller 10. In the preferred embodiment, guide bar 122 is provided with a bent free end 124. Guide bar 122 is carried by a pair of bracket assemblies 126 that are constructed so as to allow guide bar 122 to travel freely in the vertical direction while substantially restricting and preventing lateral movement. Bracket assemblies 126 are further constructed in such a fashion as to allow elongated guide bar 122 to be in substantial alignment with load bar 112.

As is appreciated by those skilled in the art, the chine portion 114 of carcass middle 116 has a natural curve along its length. In order to straighten the chine portion 114 prior to carcass middle 116 engaging scribe saw blade 72 and loin knife 64 and to ensure that carcass middle 116 engages load bar 112, an impeller assembly 130 is provided. Referring to FIGS. 6–9, a preferred embodiment of impeller assembly 130 is illustrated. Impeller assembly 130 is mounted on the side of loin puller 10 laterally displayed from the load bar assembly 110. Impeller assembly 130 forces the chine portion 114 of carcass middle 116 against load bar 112 and simultaneously assists engagement means 36 in driving carcass middle 116 toward loin knife 64. Impeller assembly 130 includes an impeller 132, a first motor 134 for driving impeller 132 laterally towards load bar 112 and a second motor 136 for rotatably driving impeller 132 in order to provide additional force in driving carcass middle 116 towards loin knife 64. First motor 134 drives impeller 132 towards load bar 112 in order to forcibly engage the chine portion 114 of carcass middle 116 against load bar 112.

In the preferred embodiment, impeller 132 is defined by an endless drive consisting of a plurality hingedly interlocking links 138, (see FIGS. 6 and 8), rotating about a first sprocket 140 and a second sprocket 142. Further, a rigid pressure block 146 and an idler sprocket 148 are displaced within the endless drive such that pressure block 146 registers with links 138 and provides support for links 138 at the point the endless drive engages chine 114 of carcass middle 116. In the preferred embodiment, first motor 134 is defined by at least one, and preferably two fluid-driven cylinders.

Figure 14:
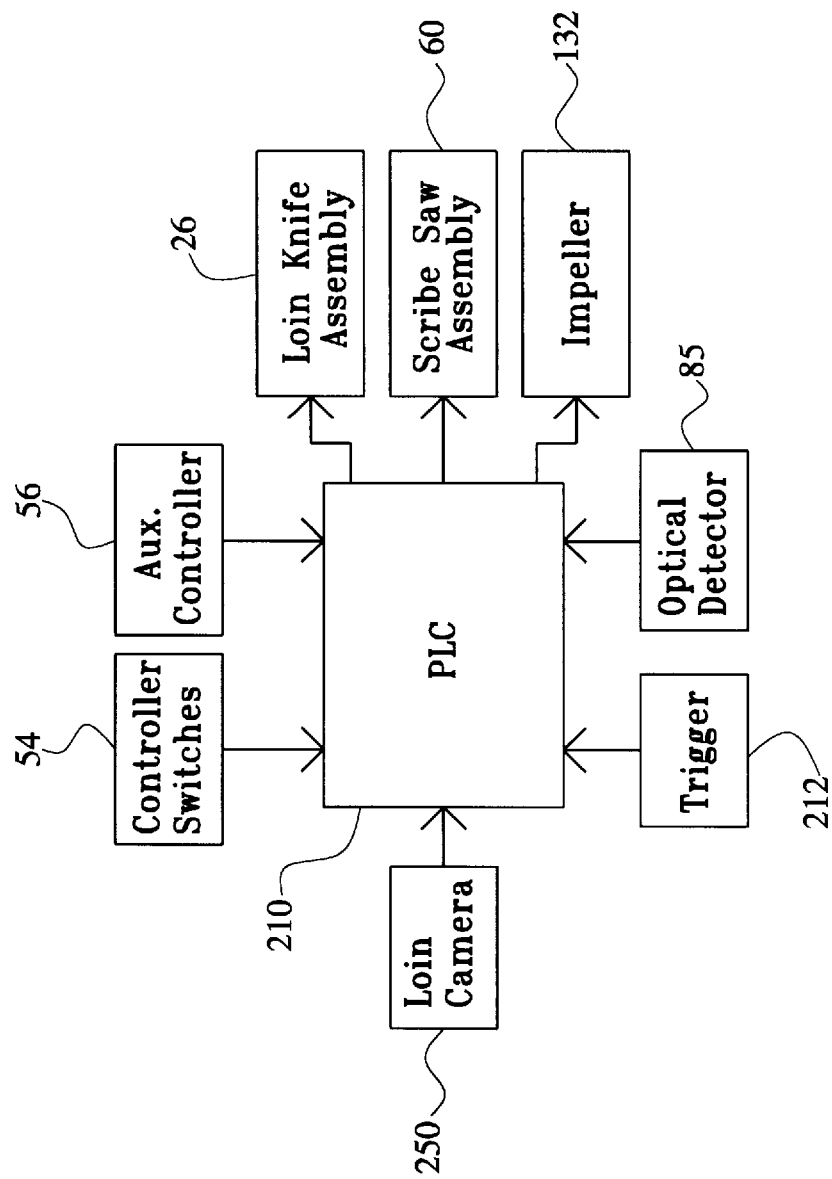
FIG. 14 illustrates a schematic view of the loin puller of the present invention including the loin camera.
Figure 15:
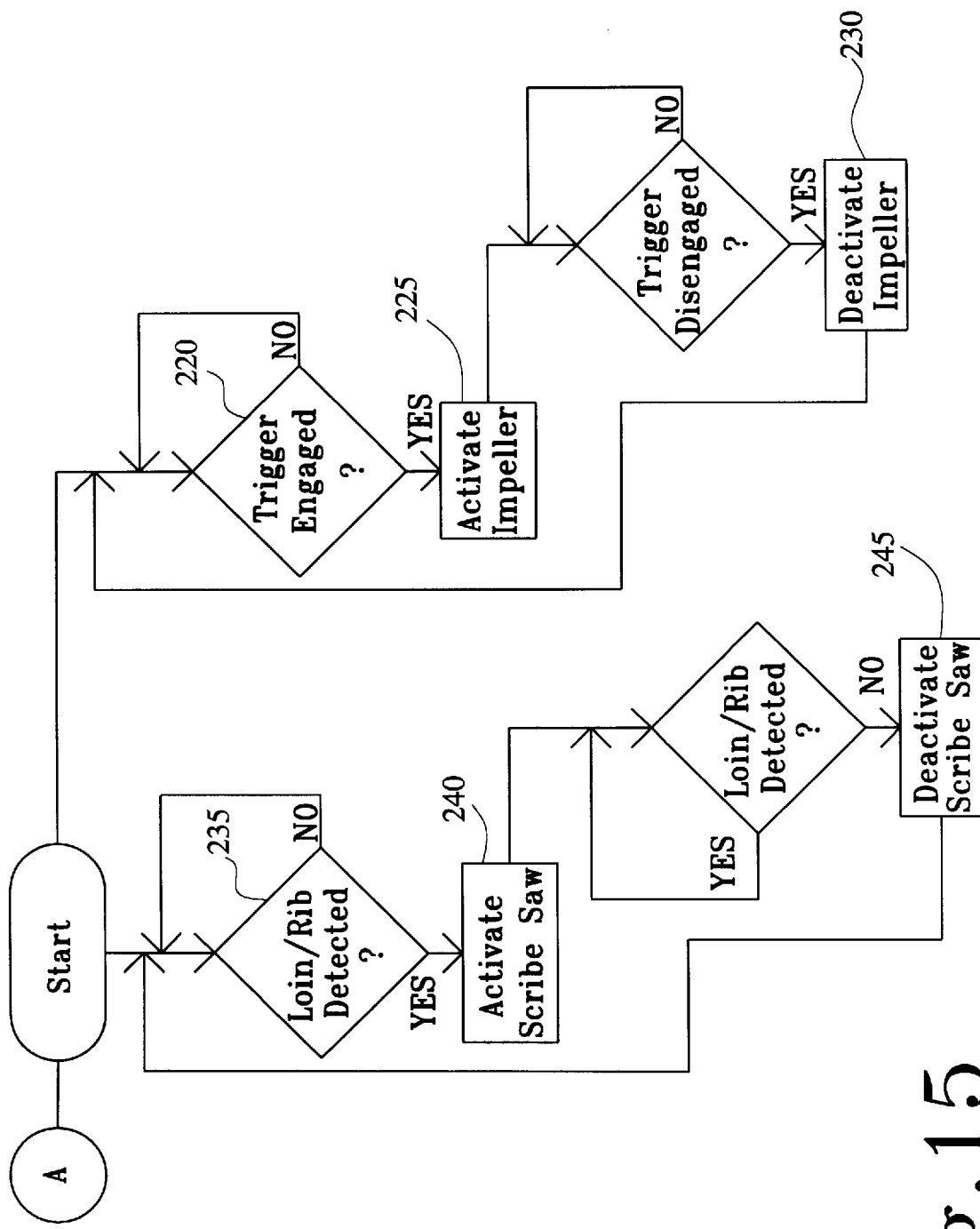
FIGS. 15, 15A and 15B are flow diagrams of the operation of the programmable logic controller.

In operation, reference being made to FIG. 15, first motor 134 is activated by the PLC 210. In this regard, a trigger mechanism 212, (shown in FIG. 14), is disposed within the path of carcass middle 116 immediately prior to impeller assembly 130. When trigger mechanism 212 is engaged at 220 by carcass middle 116, the PLC 210 activates impeller 132 at 225. When the trigger is no longer engaged, impeller 132 is deactivated as at 230. Upon activation of impeller 132, first motor 134 is activated, which in turn causes first sprocket 140 to be displaced from the idle position shown in FIGS. 6 and 7 to the engagement position shown in FIGS. 8 and 9. In order to maintain the correct amount of tension on the endless drive during the movement of first sprocket 140 between the idle position and the engagement position, a fluid-operated cylinder, defined by a pneumatic spring, or hydraulic spring, is connected to second sprocket 142.

As impeller 132 engages chine 114, motor 136 drives sprocket 140 and provides additional force to propel carcass middle 116 towards and through loin knife 64. Motor 136 is selected such that the linear velocity of the endless drive is synchronized with the linear velocity of loin engagement means 36. It will also be appreciated that motor 136 could be controlled by controller 52 in order to govern the linear velocity of the endless drive. Further, to assist the interlocking links 138 in gripping carcass middle 116, a plurality of carcass middle gripping projections 150 are disposed about the endless drive. In the preferred embodiment, each link 138 has an associated carcass middle gripping projection 150.

Referring to FIGS. 10, 11, 12 and 13, an alternate embodiment of the impeller assembly is illustrated with common components bearing the same reference numerals. Comparable but distinctive parts bear the same reference numeral with the prime notation added, and parts not previously described bear their own reference numerals. In the alternate embodiment, impeller assembly 130' is mounted on the side of loin puller 10' laterally displaced from the load bar assembly 110. Impeller assembly 130' forces the chine portion 114 of carcass middle 116 against load bar 112 and simultaneously assists engagement means 36 in driving carcass middle 116 toward loin knife 64. Impeller assembly 130' includes an impeller 132', a first motor 134 for driving impeller 132' laterally towards load bar 112 and a second motor 136 for rotatably driving impeller 132' in order to provide additional force in driving carcass middle 116 towards loin knife 64. First motor 134 drives impeller 132' towards load bar 112 in order to forcibly engage the chine portion 114 of carcass middle 116 against load bar 112. In the alternate embodiment, impeller 132' is defined by a drum member 152.

Figure 10:
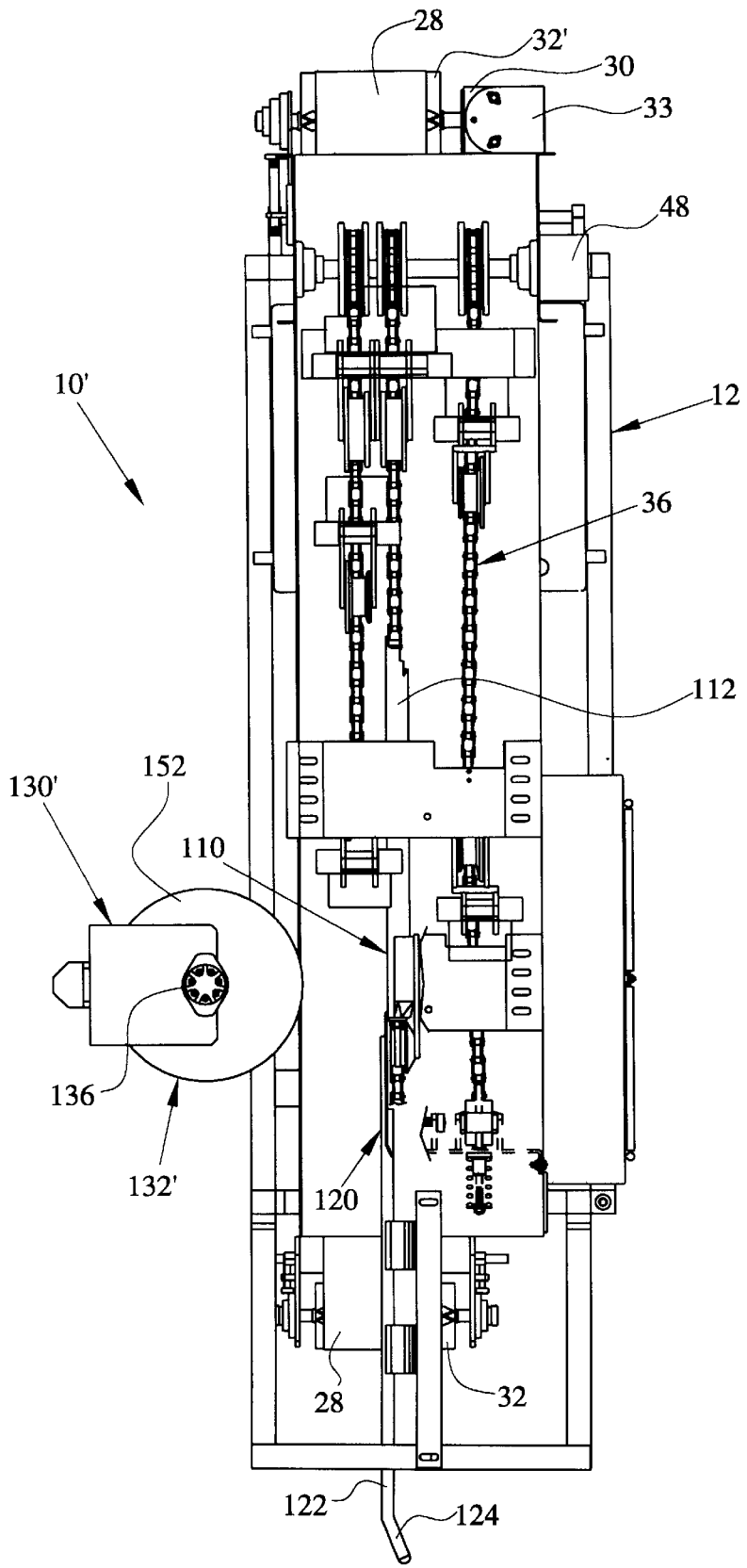
FIG. 10 illustrates a top plan view of an alternate embodiment of the loin puller shown in FIG. 1 showing the drum mechanism in the idle position.
Figure 12:
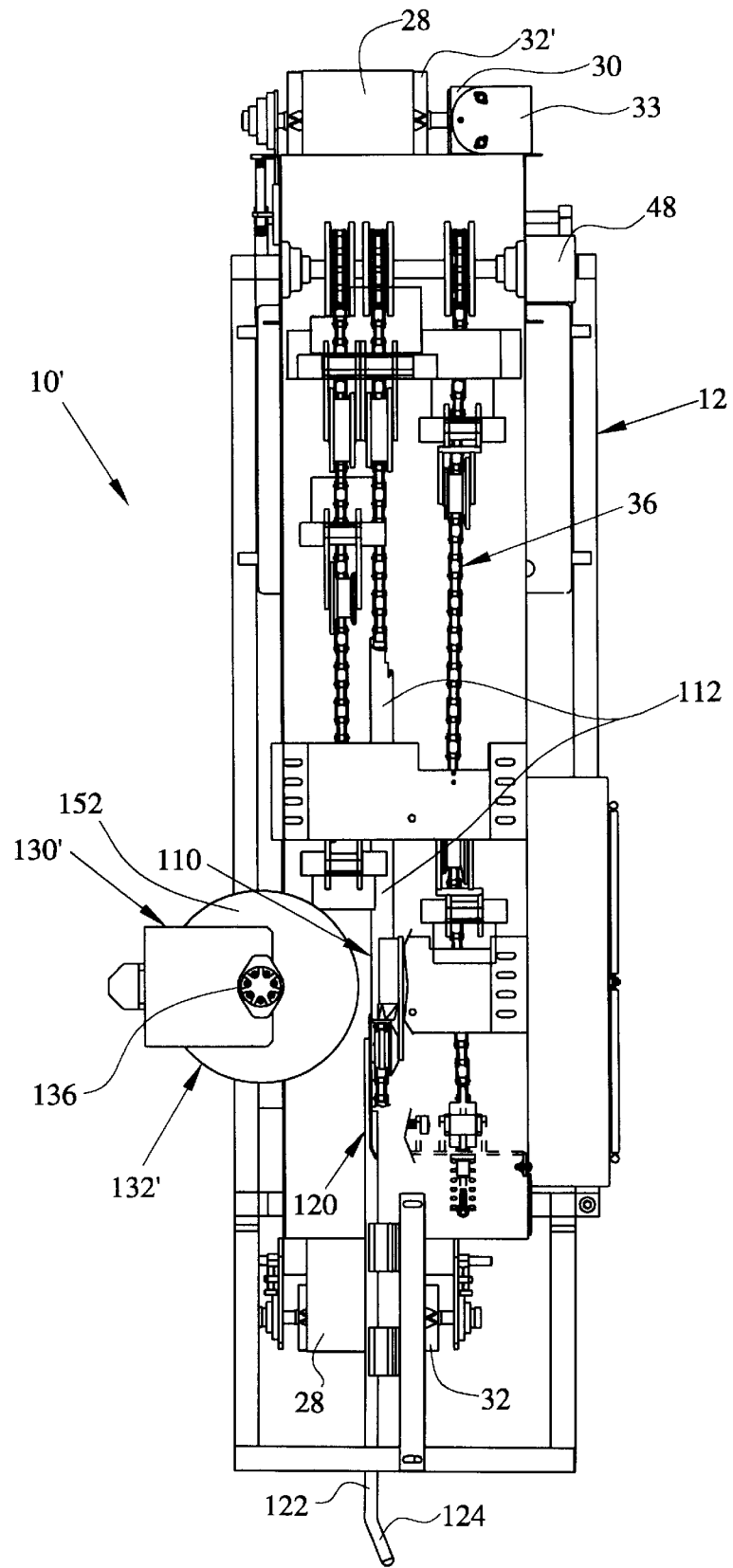
FIG. 12 illustrates a top plan view of an alternate embodiment of the loin puller shown in FIG. 1 showing the drum mechanism in the engaged position.
Figure 13:
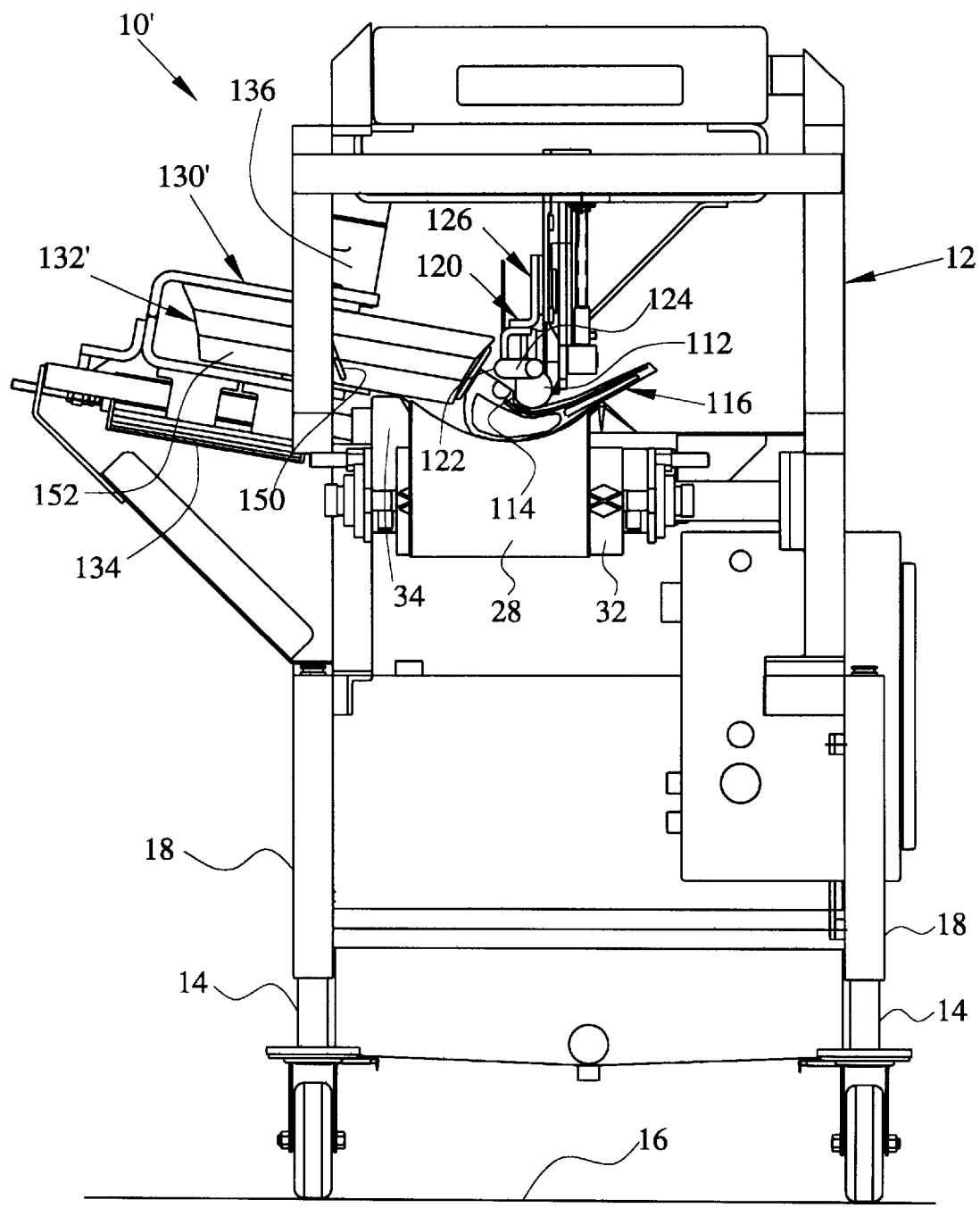
FIG. 13 illustrates a side elevation view of an alternate embodiment of the loin puller shown in FIG. 1 showing the drum mechanism engaged against a carcass middle.

The operation of this embodiment is similar to the operation described above, the idle position of drum 152 being shown in FIGS. 10 and 11 and the engagement position being shown in FIGS. 12 and 13.

As impeller 132' engages chine 114 of carcass middle 116, motor 136 drives drum 152 and provides additional force to propel carcass middle 116 towards and through loin knife 64. As discussed above with regard to the endless drive, the linear velocity of drum 152 is synchronized with the linear velocity of loin engagement means 36. Further, to assist drum 152 in gripping carcass middle 116 a plurality of carcass middle gripping projections 150 are disposed about the circumference of drum 152.

Another major departure of the present invention from that shown and described in the afore-cited U.S. Pat. No. 5,407,384 is the addition of a decelerator/depth gauge assembly 68 to the scribe saw unit 60. The assembly and operation of scribe saw unit 60 is described in greater detail in the aforementioned U.S. Pat. No. 5,407,384. As previously described in the '384 patent, scribe saw unit 60 is carried by support 76, and the relative position of the saw blade 72 is initially set depending upon the surface contour of the carcass middle. A fluid driven motor 66 rotates a saw blade 72 in a plane generally parallel to the direction of travel of a carcass middle. There is a gear housing 82 to accommodate the rotation of the blade 72 by the motor 66. Of course, it will be understood that other mechanism can be utilized to rotate the saw blade 72. Vertical movement of the saw blade 72, is achieved with a fluid driven cylinder 70. Lateral movement, i.e., in a direction perpendicular to the plane of the saw blade 72, is achieved with a fluid driven cylinder 74. As previously described in the '384 patent, blade 72 is positioned in line with the knife portion that is to pass through cut ribs of the carcass middle. Movement of saw blade 72 is synchronized with knife 64 such that the saw blade 72 can be adjusted in position to accommodate a change in the position of the knife 64. Decelerator/depth gauge assembly 68, as described in greater detail below, decelerates the downward travel of scribe saw unit 60 and limits the depth of the cut inscribed by saw blade 72 on the carcass middle ribs.

Figure 2:
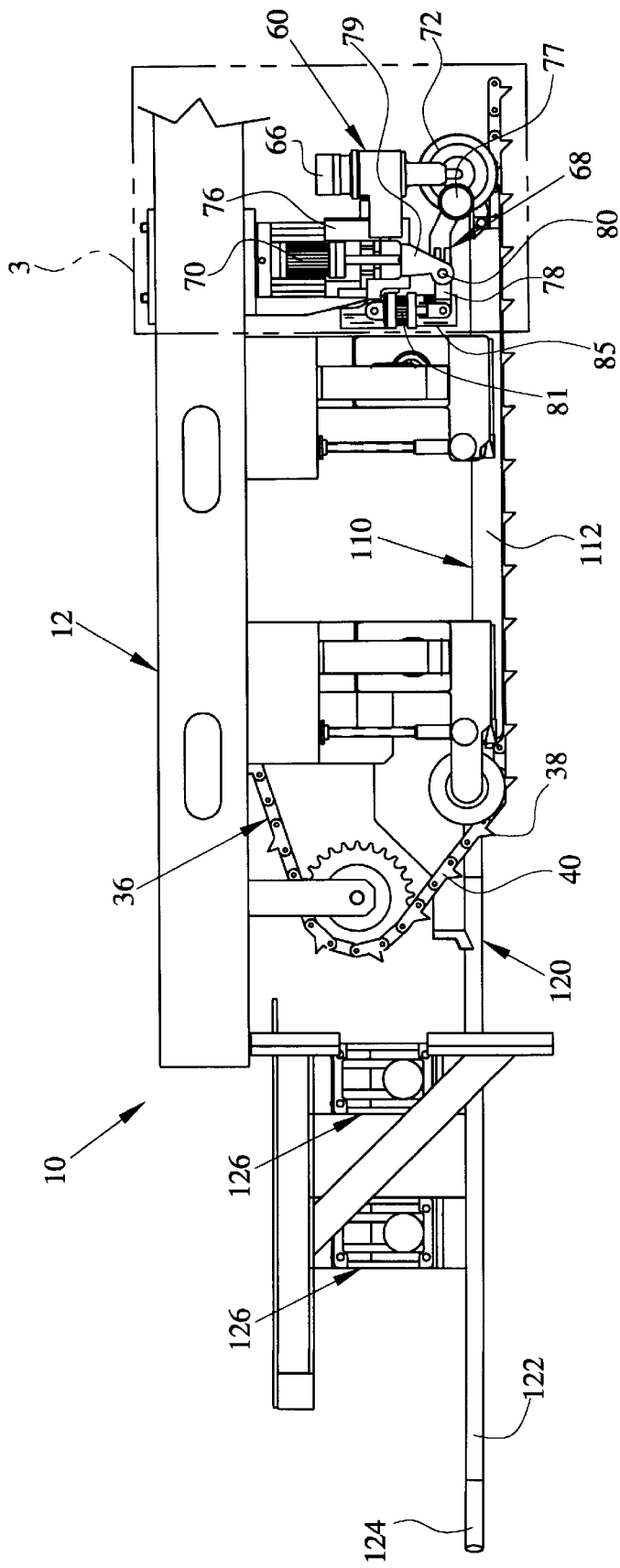
FIG. 2 is a drawing illustrating the scribe saw mechanism and depth gauge, along with the load bar and guide bar of the present invention as enlarged from the general region designated 2 in FIG. 1.
Figure 3:
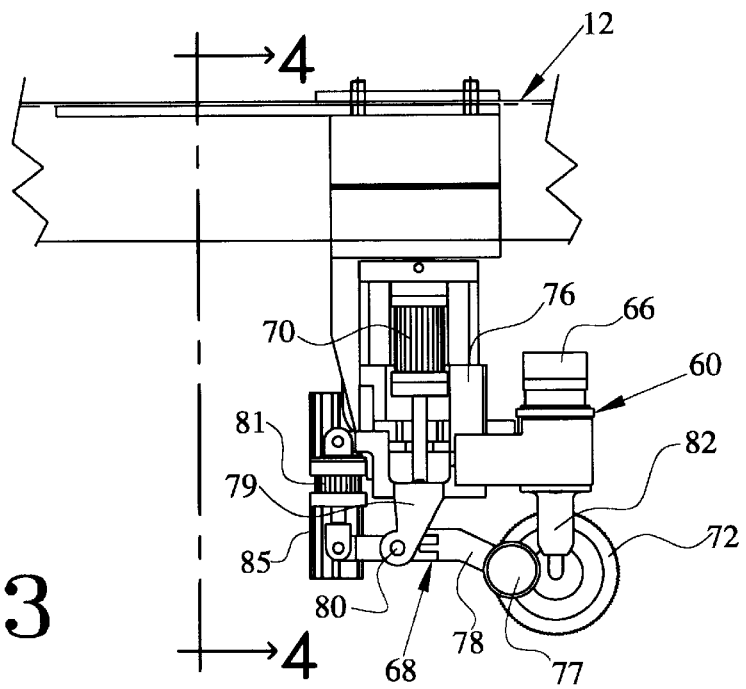
FIG. 3 is a drawing illustrating the scribe saw mechanism and depth gauge mechanism of the present invention as enlarged from the general region designated 3 in FIG. 2.
Figure 4:
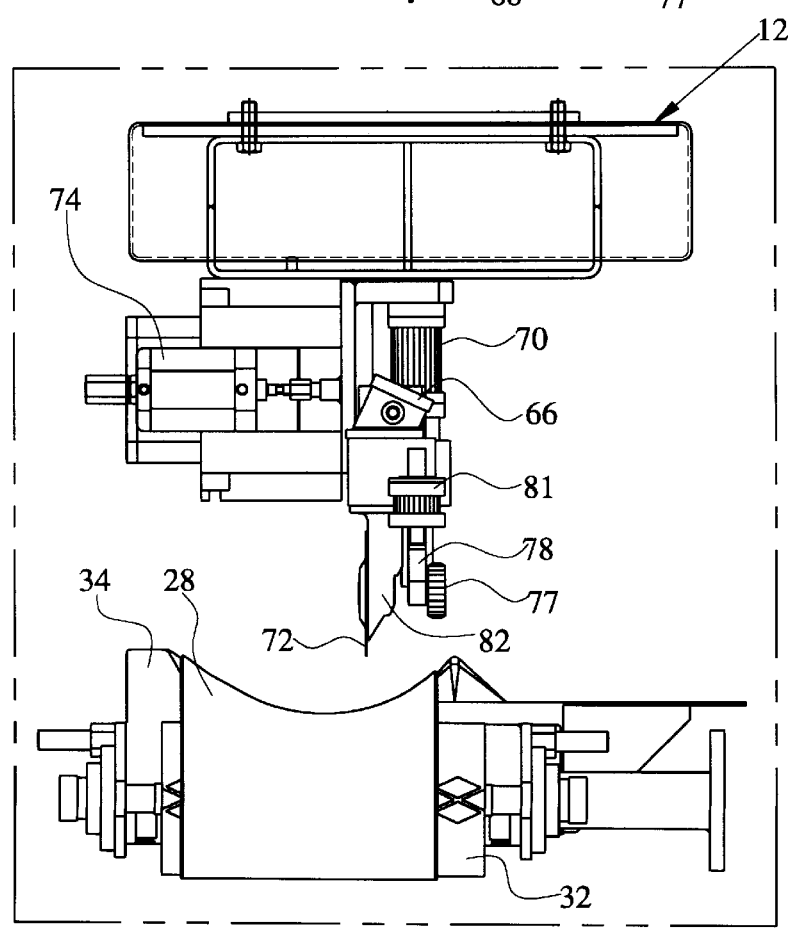
FIG. 4 illustrates a partial cross-sectional end view of the apparatus of FIG. 3, taken at 4—4 thereof.
Figure 5:
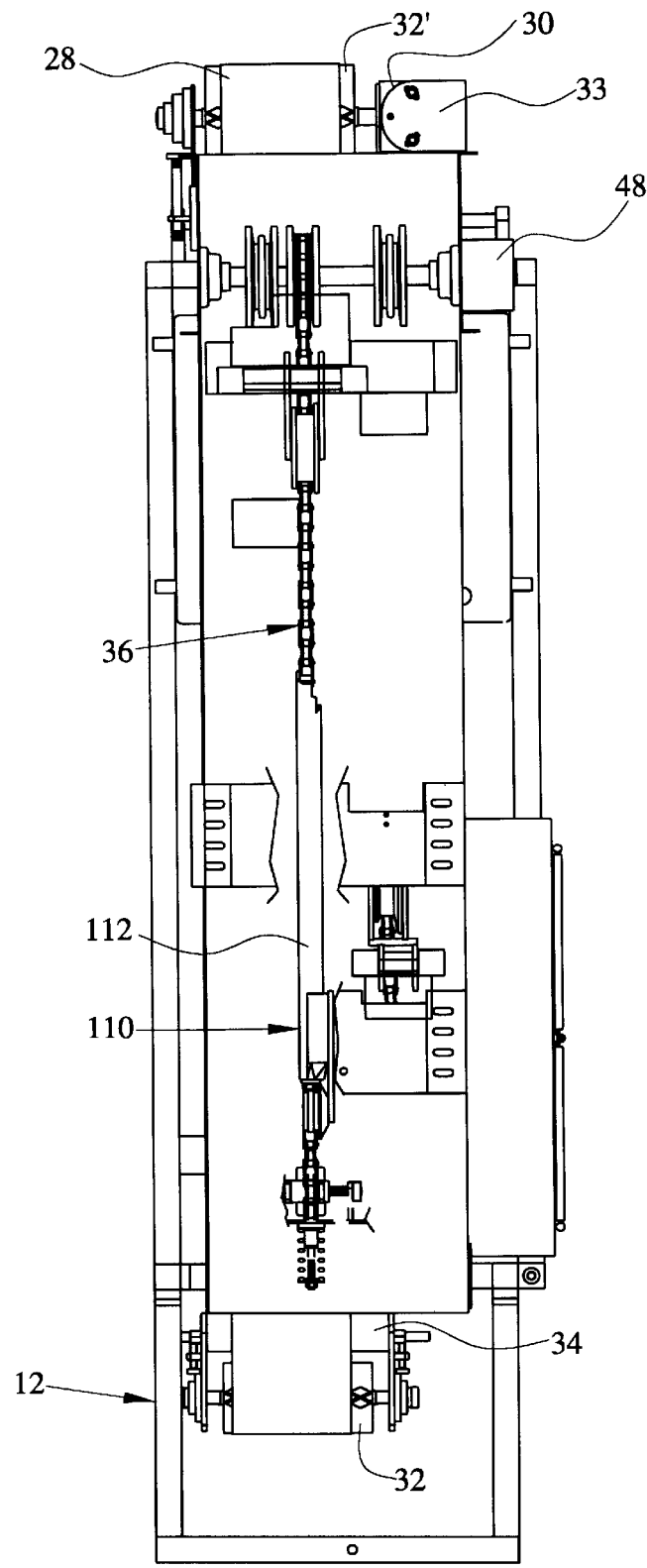
FIG. 5 illustrates a top plan view of the loin puller shown in FIG. 1, some portions of the base apparatus being cut away so as to show more clearly the position of the load bar.
Figure 6:
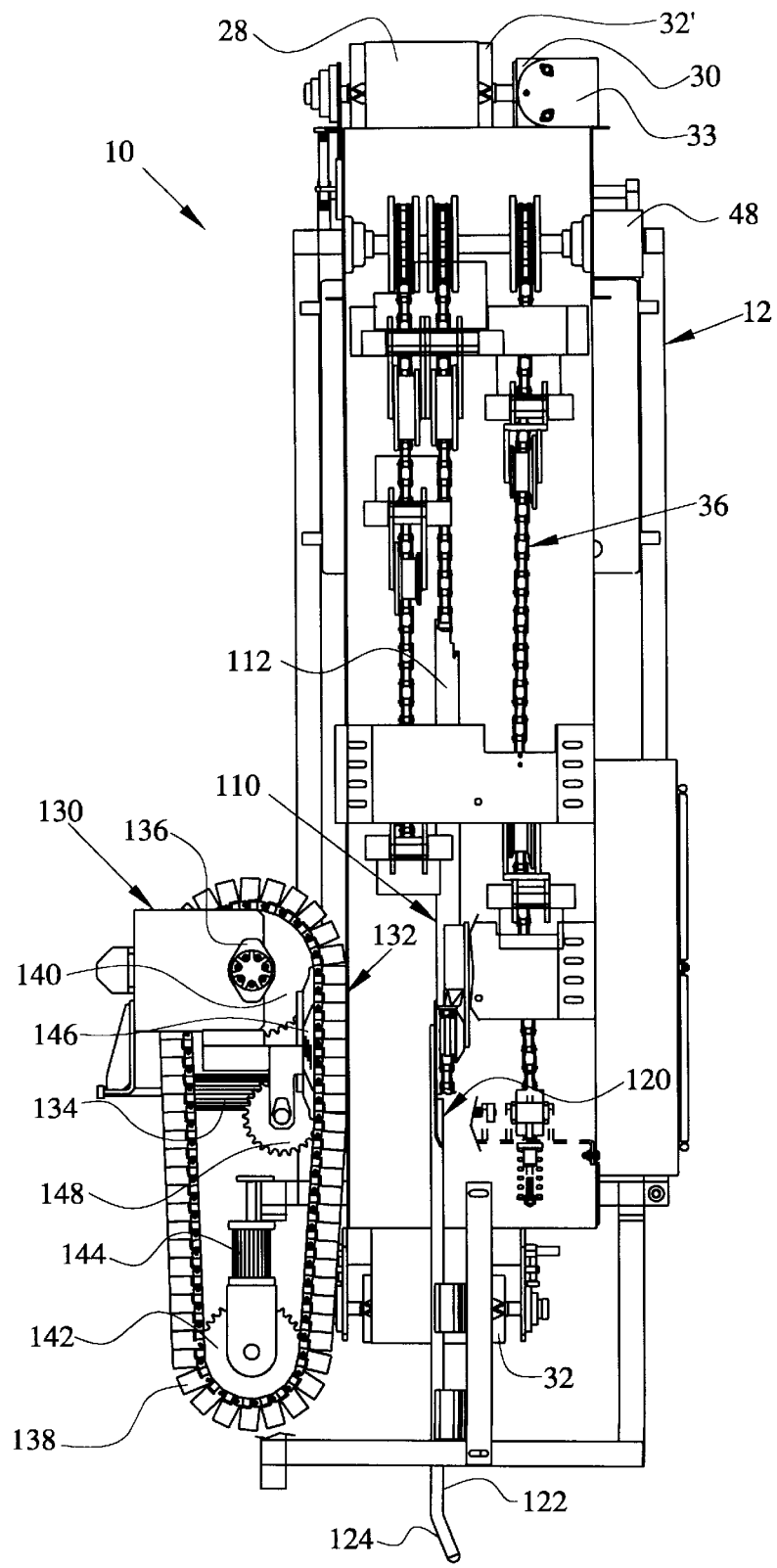
FIG. 6 illustrates a top plan view of the loin puller shown in FIG. 1 showing the endless drive mechanism in the idle position.
Figure 7:
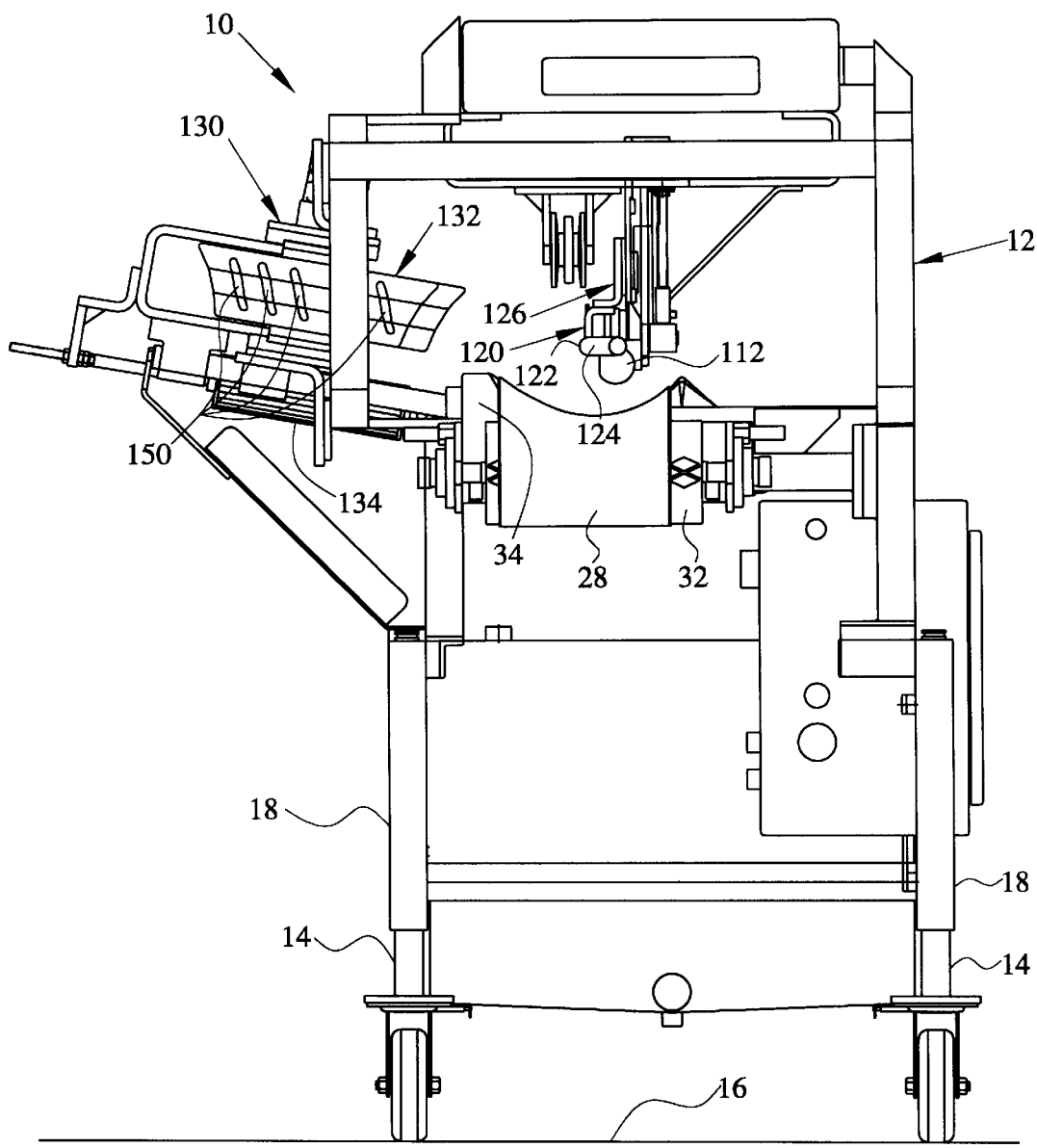
FIG. 7 illustrates a side elevation view of the loin puller shown in FIG. 1 showing the endless drive mechanism in the idle position.
Figure 8:
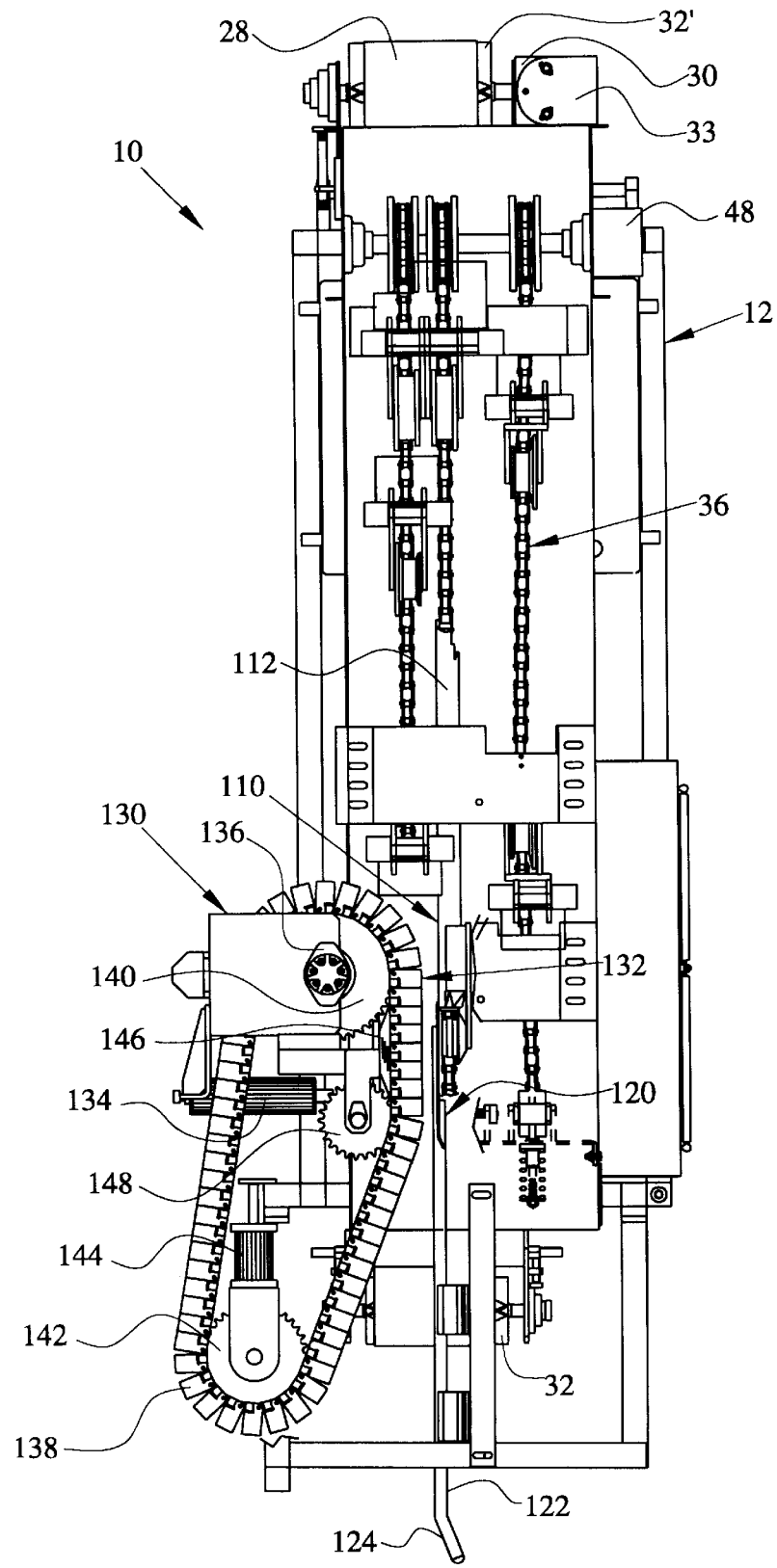
FIG. 8 illustrates a top plan view of the loin puller shown in FIG. 1 showing the endless drive mechanism in the engaged position.
Figure 9:
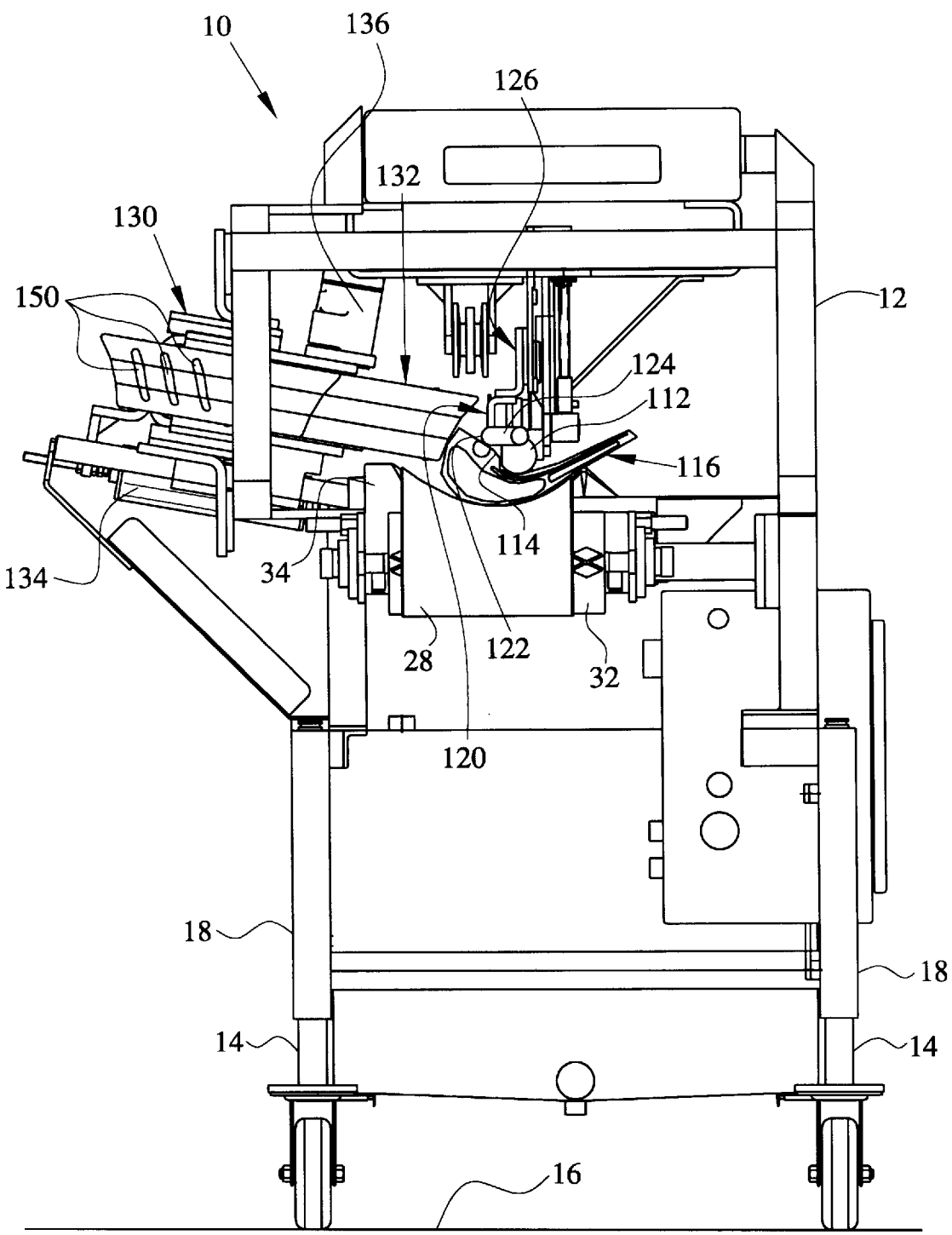
FIG. 9 illustrates a side elevation view of the loin puller shown in FIG. 1 showing the endless drive mechanism engaged against a carcass middle.

Greater detail of the scribe saw unit is shown in FIG. 2, a region generally indicated at 2 of FIG. 1, and FIG. 3, a region generally indicated at 3 of FIG. 2. Referring to FIG. 2, decelerator/depth gauge assembly 68 includes a small roller 77 positioned proximate saw blade 72. Roller 77 is mounted on arm 78. Arm 78 is carried by support 76 by means of bracket 79 and pin 80. Cylinder 81 is connected to the opposite end of arm 78 from roller 77. As roller 77 engages a carcass middle, during the downward travel of saw blade 72, arm 78 pivots around pin 80. Cylinder 81 is also mounted on support 76 and provides resistance to the pivoting of arm 78. Cylinder 81 thus, decelerates the rate of downward travel of saw blade 72. Downward travel of saw blade 72 is stopped, thus limiting the depth of cut of saw blade 72, when the pivoting of arm 78 reaches the maximum range of motion allowable by cylinder 81. Thus, selection of the resistance and range of motion allowed by cylinder 81 allows modification of the rate of deceleration and depth of cut of saw blade 72.

Actuation of the cylinder 74 for lateral movement of the saw blade 72 is achieved through one or more types of control. For example, the auxiliary controller 56 operable by a process worker can have an appropriate switch to energize a pneumatic-hydraulic system for application of fluid to the cylinder 74. Another type of control can be through a computer control via the PLC 210 for controlling the position of the scribe saw blade 72 during passage of a carcass middle through the machine. In this regard, one or more optical sensors 85, shown in FIGS. 2 and 3, can be positioned above work surface 34 in the carcass middle path and proximate scribe saw unit 60. Referring to FIGS. 14 and 15, optical sensor 85 would be in electronic communication with the PLC 210. In this regard, referring to FIG. 15, upon detection of the rib and loin portion of the carcass by optical sensor 85 at 235, the PLC 210 would activate scribe saw unit 60 at 240. And, when the optical sensor 85 detects that the rib section has passed through, the PLC 210 would deactivate scribe saw unit 60 as at 245. Alternatively, a second optical sensor (not shown) could be positioned slightly downstream from scribe saw unit 60 in order to detect when the rib section has passed scribe saw unit 60. In the preferred embodiment an air jet, (not shown), would keep the lens portion of optical sensor 85 clear of debris.

As is discussed in the above-cited U.S. Pat. No. 5,234, 371, the knife assembly 26 permits the loin knife 64 to be raised, lowered, or widened in cut depending upon the size of the loin. Control of this selective positioning of loin knife 64 can either be manually, such as by use of auxiliary controller 56 or can be under control of PLC 210. Referring to FIGS. 14, and 15A, in one embodiment, a loin camera 250, in FIG. 14, is utilized to take a snapshot image 252 of the end of the carcass middle as the carcass middle progresses thru the loin puller. This image is digitized and the optimal depth and/or width of the loin knife is determined 254 based on the ratio of loin area and depth of backfat. This determination could be based on an algorithmic formula or could be selected from a range of values in a look-up table stored in the memory of PLC 210. The depth and/or width of the loin knife 62 are then adjusted based on this determination 256. However, in the event that PLC 210 receives manual input from auxiliary controller 56, such as a manual override, the depth and/or width of loin knife 64 are adjusted according to the manual input 258.

Figure 15B:
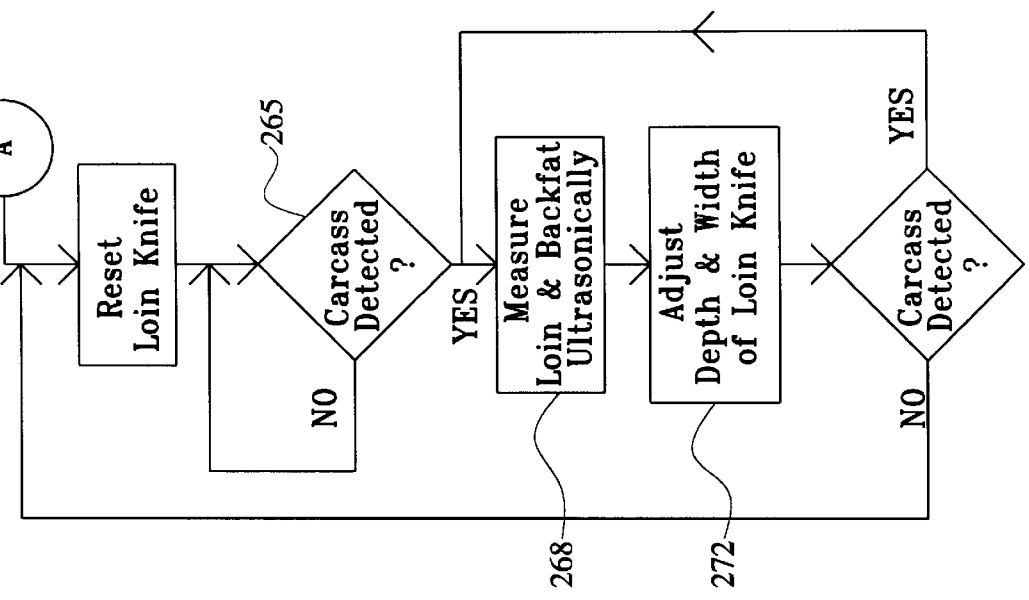
Figure 15A:
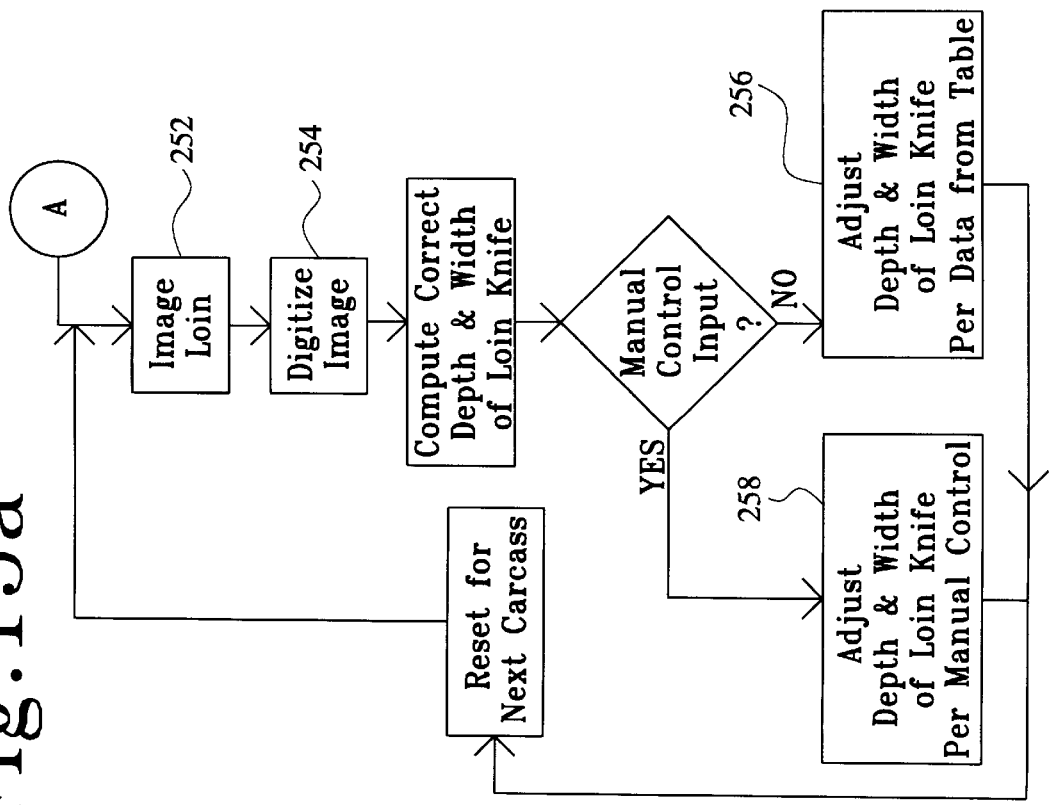
Figure 16:
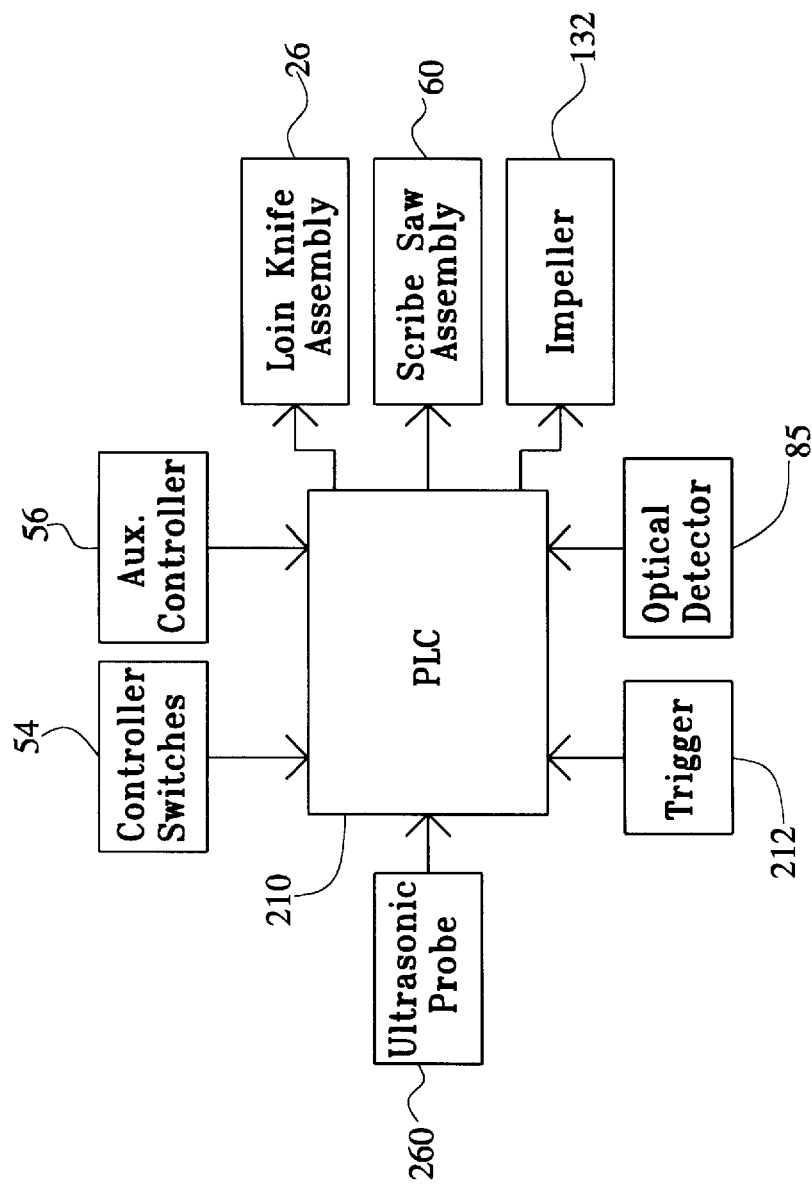
FIG. 16 illustrates a schematic view of the loin puller of the present invention including the ultrasonic probe.

An alternate, and preferred means of automatically adjusting the depth and/or width of cut of loin knife 64, is illustrated in FIGS. 15B and 16. In this regard, an ultrasonic probe 260 could be utilized to sense tissue density in carcass middle and thereby measure the width of the loin and the depth of the fatback. Ultrasonic probe 260, in conjunction with PLC 210 could provide real time adjustment of the depth and/or width of loin knife 64 and, could be positioned beneath conveyor belt 28 in substantial alignment with loin knife 64. In this manner, PLC 210 could control the precise cut geometry through the full length of the carcass middle, by providing real-time adjustment of the depth and/or width of cut as the carcass middle progresses through loin knife 64. Referring to FIG. 15B, ultrasonic probe 260 would detect the presence of carcass middle at 265 and then measure the backfat and loin ultrasonically at 268. The depth and/or width of cut of loin knife 64 would be adjusted at 272. When the carcass middle had progressed through loin knife 64 such that it was no longer detected, loin knife 64 could be reset to a preselected geometry in preparation for the next loin cut.

It will be recognized by persons skilled in the art that there is a right-hand half of a carcass middle as well as a left-hand half. The mechanisms illustrated in FIGS. 1 through 3 depict those for the left-hand portion of a carcass middle. It will be recognized therefore, that equivalent mechanisms are provided for the right-half portion as for the left half portion.

From the foregoing, it will be understood by persons skilled in the art that a considerable improvement has been made in loin puller apparatus such as that described in the afore-cited U.S. Pat. No. 5,234,371 and U.S. Pat. No. 5,407,384. This improvement includes controlling the depth of the cut of the ribs of a carcass middle just prior to the movement of the carcass middle to the loin separating knife. Further, in order to more easily align a carcass middle in the machine, a guide bar is provided, and a load bar that engages the chine in order to uniformly align the carcass middle with the loin knife is also provided. An impeller provides means for pressing the chine of the carcass middle against the load bar as the carcass middle travels through the loin puller so as to substantially straighten the chine before the carcass middle engages the loin knife.

Although specific reference is made to the pieces of equipment for a preferred embodiment, this is for the purpose of illustration rather than for limitation. It will be understood that it is not intended to limit the disclosure, but rather it is intended to cover all modifications and alternate methods falling within the spirit and the scope of the invention as defined in the appended claims.

Having thus described the aforementioned invention, I claim:

1. An apparatus for processing an animal carcass middle and separating at least the loin thereof, said apparatus comprising:

a frame for elevating a working surface a distance above a support surface;

a loin separator knife assembly carried by said frame at a first selected location, said loin separator knife assembly providing for adjustment of depth and width of cut of a loin knife blade;

a conveyor belt assembly carried by said frame having a conveyor belt for conveying the carcass middle toward said first selected location to engage said loin knife blade;

a carcass middle gripper assembly carried by said frame for gripping the carcass middle and forcing the carcass middle against said conveyor belt and toward said first selected location;

a scribe saw assembly mounted on said frame such that said scribe saw assembly moves vertically and laterally, said scribe saw assembly having a saw blade for cutting through at least a portion of the carcass middle, whereby a kerf of a selected depth is created, said scribe saw assembly provided with means for positioning said saw blade in alignment with a portion of said loin knife blade whereby said loin knife blade passes through the carcass middle at a kerf created by said saw blade; and a depth gauge assembly mounted proximate said scribe saw assembly, whereby said depth gauge assembly moves vertically as said saw blade moves vertically, said depth gauge assembly having a depth gauge for decelerating the vertical movement of said saw blade as said saw blade moves vertically in a downward direction and for limiting said selected depth of said kerf created by said saw blade.

2. The apparatus of claim 1 wherein said carcass middle gripper assembly includes a plurality of chain members and at least two sprocket members carrying said chain members, said chain members having chain links defining an endless loop configuration engaged with said sprocket members, a portion of said chain links carrying extended portions to engage the carcass middle, said chain members being moved to assist in moving the carcass middle toward said loin knife blade.

3. The apparatus of claim 2 further comprising biasing means for biasing each of said chain members toward the carcass middle, said biasing means including at least one idler wheel positioned against said chain members and spring biasing means interposed between said idler wheel and said frame.

4. The apparatus of claim 1 further comprising a sensor means for detecting the carcass middle and for actuating said vertical movement of said scribe saw assembly, said sensor means being carried by said frame proximate said scribe saw assembly.

5. The apparatus of claim 2 wherein said apparatus further comprises:
  a load bar assembly carried by said frame at a second selected position having an elongated load bar for engaging a chine portion of the carcass middle and for alignment the carcass middle in a selected alignment with said loin separator knife;
  a guide bar assembly carried by said frame proximate said load bar assembly having an elongated guide bar for engaging the carcass middle as the carcass middle engages said apparatus, said guide bar being in substantial alignment with said load bar, whereby said guide bar aligns the carcass middle with said load bar; and
  an impeller assembly carried by said frame for forcing the chine portion of the carcass middle against said load bar and simultaneously driving the carcass middle toward said first selected location, said impeller assembly having an impeller for engaging the carcass half, a first motor for driving said impeller laterally towards said load bar and a second motor for rotatably driving said impeller whereby the chine portion of the carcass middle forcibly engages said load bar and the carcass middle is driven towards said first selected location.

6. The apparatus of claim 5 wherein said elongated load bar has an inverted channel and wherein one of said chain members registers with said inverted channel.

7. The apparatus of claim 5 wherein said impeller is defined by an endless drive consisting of a plurality hingedly interlocking links rotating about at least first and second sprockets and wherein said impeller assembly further comprises a pressure block for providing a support for said links as said links engages the carcass middle; a fluid-driven cylinder connected to one of said sprockets for maintaining tension on said endless drive; and at least one carcass middle gripping projection carried by said interlocking links.

8. The apparatus of claim 5 wherein said impeller is defined by a rotatably driven drum and wherein said impeller assembly further comprises a fluid-driven cylinder connected to said drum for driving said drum laterally towards said load bar; and a plurality of carcass middle gripping projections carried by said drum.

9. An apparatus for processing an animal carcass middle and separating at least the loin thereof, said apparatus comprising:
  a frame for elevating a working surface a distance above a support surface;
  a loin separator knife assembly carried by said frame at a first selected location, said loin separator knife assembly providing for adjustment of depth and width of cut of a loin knife blade;
  a conveyor belt assembly carried by said frame having a conveyor belt for conveying the carcass middle toward said first selected location to engage said loin knife blade;
  a load bar assembly carried by said frame at a second selected position having an elongated load bar for engaging a chine portion of the carcass middle and for aligning the carcass middle in a selected alignment with said loin separator knife;
  a guide bar assembly carried by said frame proximate said load bar assembly having an elongated guide bar for engaging the carcass middle as the carcass middle engages said apparatus, said guide bar being in substantial alignment with said load bar, whereby said guide bar aligns the carcass middle with said load bar;
  an impeller assembly carried by said frame for forcing the carcass middle against said load bar and simultaneously driving the carcass middle toward said first selected location, said impeller assembly having an impeller for engaging the chine portion of the carcass middle, a first motor for driving said impeller laterally towards said load bar and a second motor for rotatably driving said impeller whereby the chine portion of the carcass middle forcibly engages said load bar and the carcass middle is driven towards said first selected location;
  a carcass middle gripper assembly carried by said frame for gripping the carcass middle and forcing the carcass middle against said conveyor belt and toward said first selected location;
  a scribe saw assembly mounted on said frame such that said scribe saw assembly moves vertically and laterally, said scribe saw assembly having a saw blade for cutting through at least a portion of the carcass middle, whereby a kerf of a selected depth is created, said scribe saw assembly provided with means for positioning said saw blade in alignment with a portion of said loin knife blade whereby said loin knife blade passes through the carcass middle at a kerf created by said saw blade;
  a depth gauge assembly mounted proximate said scribe saw assembly, whereby said depth gauge assembly moves vertically as said saw blade moves vertically, said depth gauge assembly having a depth gauge for decelerating the vertical movement of said saw blade as said saw blade moves vertically in a downward direction and for limiting said selected depth of said kerf created by said saw blade; and
  a sensor means for detecting the carcass middle and for actuating said vertical movement of said scribe saw assembly, said sensor means being carried by said frame proximate said scribe saw assembly.

10. The apparatus of claim 9 wherein said carcass middle gripper assembly includes a plurality of chain members and at least two sprocket members carrying said chain members, said chain members having chain links defining an endless loop configuration engaged with said sprocket members, a portion of said chain links carrying extended portions to engage the carcass middle, said chain members being moved to assist in moving the carcass middle toward said loin knife blade.

11. The apparatus of claim 10 further comprising biasing means for biasing each of said chain members toward the carcass middle, said biasing means including at least one idler wheel positioned against said chain members and spring biasing means interposed between said idler wheel and said frame.

12. The apparatus of claim 10 wherein said apparatus further comprises means for automatically adjusting the depth of cut of said loin knife and for automatically adjusting the width of cut of said loin knife.

13. The apparatus of claim 9 wherein said impeller is defined by an endless drive consisting of a plurality of hingedly interlocking links rotating about at least first and second sprockets and wherein said impeller assembly further comprises a pressure block for providing a support for said links as said links engages the carcass middle; a fluid-driven cylinder connected to one of said sprockets for maintaining tension on said endless drive; and at least one carcass middle gripping projection carried by said interlocking links.

14. The apparatus of claim 9 wherein said impeller is defined by a rotatably driven drum and wherein said impeller assembly further comprises a fluid-driven cylinder connected to said drum for driving said drum laterally towards said load bar; and a plurality of carcass middle gripping projections carried by said drum.

15. An apparatus for processing an animal carcass middle and separating at least the loin thereof, said apparatus comprising:

a frame for elevating a working surface a distance above a support surface;

a loin separator knife assembly carried by said frame at a first selected location, said loin separator knife assembly providing for adjustment of depth and width of cut of a loin knife blade;

a conveyor belt assembly carried by said frame having a conveyor belt for conveying the carcass middle toward said first selected location to engage said loin knife blade;

a load bar assembly carried by said frame at a second selected position having an elongated load bar for engaging a chine portion of the carcass middle and for aligning the carcass middle in a selected alignment with said loin separator knife;

a guide bar assembly carried by said frame proximate said load bar assembly having an elongated guide bar for engaging the carcass middle as the carcass middle engages said apparatus, said guide bar being in substantial alignment with said load bar, whereby said guide bar aligns the carcass middle with said load bar;

impeller means for forcing the chine portion of the carcass middle against said load bar and simultaneously driving the carcass middle toward said first selected location carried by said frame, said impeller means having an impeller for engaging the carcass middle, a first means for driving said impeller laterally towards said load bar and a second means for rotatably driving said impeller whereby the chine portion of the carcass middle forcibly engages said load bar and the carcass middle is driven towards said first selected location;

a carcass middle gripper assembly carried by said frame for gripping the carcass middle and forcing the carcass middle against said conveyor belt and toward said first selected location;

a scribe saw assembly mounted on said frame such that said scribe saw assembly moves vertically and laterally, said scribe saw assembly having a saw blade for cutting through at least a portion of the carcass middle, whereby a kerf of a selected depth is created, said scribe saw assembly provided with means for positioning said saw blade in alignment with a portion of said loin knife blade whereby said loin knife blade passes through the carcass middle at a kerf created by said saw blade; and depth gauge means for decelerating the vertical movement of said saw blade as said saw blade moves vertically in a downward direction and for limiting said selected depth of said kerf created by said saw blade, said depth gauge means being mounted proximate said scribe saw assembly, whereby said depth gauge means moves vertically as said saw blade moves vertically.

16. The apparatus of claim 15 wherein said carcass middle gripper assembly includes a plurality of chain members and at least two sprocket members carrying said chain members, said chain members having chain links defining an endless loop configuration engaged with said sprocket members, a portion of said chain links carrying extended portions to engage the carcass middle, said chain members being moved to assist in moving the carcass middle toward said loin knife blade.

17. The apparatus of claim 15 further comprising a sensor means for detecting the carcass middle and for actuating said vertical movement of said scribe saw assembly, said sensor means being carried by said frame proximate said scribe saw assembly.

18. The apparatus of claim 16 wherein said elongated load bar has an inverted channel and wherein one of said chain members registers with said inverted channel.

19. The apparatus of claim 15 wherein said impeller is defined by an endless drive consisting of a plurality of hingedly interlocking links rotating about at least first and second sprockets and wherein said impeller means further comprises:

a pressure block for providing a support for said links as said links engages the carcass middle;

a fluid-driven cylinder connected to one of said sprockets for maintaining tension on said endless drive; and at least one carcass middle gripping projection carried by said interlocking links.

20. The apparatus of claim 15 wherein said impeller is defined by a rotatably driven drum and wherein said impeller means further comprises a plurality of carcass middle gripping projections carried by said drum.

* * * * *